J. DE MARTINO.
POWER TRANSMISSION MECHANISM.
APPLICATION FILED JULY 16, 1918.

1,431,781.

Patented Oct. 10, 1922.
4 SHEETS—SHEET 1.

Fig.1.

INVENTOR
Joseph de Martino
Dyrenforth, Lee, Chritton & Wiles,
ATT'YS

Patented Oct. 10, 1922.

1,431,781

UNITED STATES PATENT OFFICE.

JOSEPH DE MARTINO, OF CHICAGO, ILLINOIS, ASSIGNOR TO MECHANICAL IMPROVEMENT CO., OF CHICAGO, ILLINOIS, A CORPORATION OF ILLINOIS.

POWER-TRANSMISSION MECHANISM.

Application filed July 16, 1918. Serial No. 245,185.

*To all whom it may concern:*

Be it known that I, JOSEPH DE MARTINO, a citizen of Italy, who have taken out my first papers for citizenship in the United States, residing at Chicago, in the county of Cook and State of Illinois, have invented a new and useful Improvement in Power-Transmission Mechanism, of which the following is a specification.

This invention relates particularly to power-transmission mechanism of a type enabling any desired speed ratio from zero to a given maximum to be employed.

The invention constitutes an improvement on the invention described in my Patent No. 1,310,115, granted July 15, 1919.

The primary object of the invention is to provide easily controlled mechanism of the character indicated, which is simple in construction, durable and reliable.

A further object is to provide such mechanism in a form which is especially adapted to use in motor-driven vehicles, such as automobiles, trucks, power-boats, and the like.

In the preferred construction, adapted to ordinary automobile use, for example, my invention comprises spring-connected alined driving and driven-shafts provided with main clutches for direct drive, both of said shafts being longitudinally shiftable or having longitudinally shiftable sections; variable-throw transmission mechanism between said shafts provided with means for rotating the driven shaft in either direction, and including transversely shiftable eccentrics mounted on the driving shaft and adjustable by and actuated through the medium of said driving-shaft, or a section thereof; a spring-retracted foot-lever controlling the position of the driving-shaft section and through the medium thereof controlling the adjustment of the eccentrics as well as the direct connection of the driving-shaft with the driven-shaft; and a vehicle-controlling hand-lever controlling the position of the driven-shaft, which driven-shaft is provided with an auxiliary clutch-member for clutching it either to the forwardly rotating gear or the rearwardly rotating gear of the transmission mechanism, which gears are journaled on the driven shaft. In the preferred construction, also, the hand-lever may be set in either of three positions, thus positioning the driven shaft for forward drive, neutral position, or reverse drive. In this preferred construction, when the hand-lever is set for forward-drive, the clutch-member of the driven-shaft is in engagement with the forward gear of the transmission mechanism, and the forward speed of the vehicle may then be controlled wholly by the foot-lever, which, as it is retracted by the spring devices, shifts the eccentrics gradually from the concentric position to maximum eccentricity, thus bringing the driven-shaft to a speed approximating that of the driving-shaft, after which a further retraction of the foot-lever returns the eccentrics to a concentric position, establishes direct-drive connection between the driving-shaft and the driven shaft, and disengages the auxiliary clutch-member of the driven-shaft from the forward gear journaled thereon, the driven-shaft slipping through the ring of the hand-lever during the action of disengaging the auxiliary clutch. In the neutral position of the hand-lever, neither the forward-drive nor the rearward-drive can be established; and in the reverse position of the hand-lever, the auxiliary clutch-member of the driven-shaft engages the clutch-member of the reverse gear on the driven-shaft, so that the latter will rotate in a direction the reverse of the direction of rotation of the driving-shaft.

The invention, in its preferred embodiment is illustrated in the accompanying drawings, in which—

In the embodiment illustrated, the invention comprises a gear-casing A; a driving-shaft B; a driven-shaft C in alinement therewith; variable speed transmission mechanism D between the driving and driven-shafts; and including eccentric devices $D^1$ mounted on the driving shaft, and a forward gear $D^2$ and a reverse gear $D^3$ journaled on the driven-shaft; a foot-lever E equipped with a ring $E^1$, through the medium of which the driving-shaft is adjusted longitudinally; and a vehicle-controlling hand-lever F equipped with a ring $F^1$, through the medium of which the driven-shaft may be adjusted to correspond with forward, neutral and reverse positions.

The gear-casing A may be of any approved construction. In its upper portion is journaled a longitudinally immovable tubular shaft $B^1$, which may be regarded as an auxiliary driving-shaft, and upon which the eccentric devices $D^1$ are mounted.

The shaft B is longitudinally movable in or through the tubular shaft $B^1$, and serves to rotate the shaft $B^1$, as well as to adjust the eccentrics. The tubular shaft $B^1$ is in the nature of a rotating stub-shaft journaled in an anti-friction bearing 1 in one end of the casing, in such a manner as to prevent longitudinal movement, and at the same time permit free rotation. The shaft B is provided with a reduced extension 2; and the driven shaft C is tubular, telescopes with the extension 2, and extends into the tubular shaft $B^1$. The driving-shaft B is provided with a further reduced extension $2^a$, which is encircled by a coil-spring 3, confined between an internal shoulder 4 of the shaft C and an anti-friction collar 5, which is adapted to be secured on the extremity of the extension $2^a$ by means of a nut 6. The adjacent ends of the driving-shaft B and driven-shaft C are provided with main clutches 7 and 8, respectively, by means of which direct-coupling of the shafts is effected. The driven-shaft C is also provided with an auxiliary clutch-member 9, by means of which the driven-shaft may be clutched either to the forward gear $D^2$ or the reverse gear $D^3$ of the variable speed transmission mechanism D. The forward gear $D^2$ is equipped with a clutch-member $9^a$ adapted to interlock with the clutch-member 9; and the reverse gear $D^3$ is equipped with a clutch-member $9^b$ adapted to interlock with the clutch-member 9.

The driven-shaft C is journaled in an anti-friction bearing 10 in alinement with the bearing 1, and at the opposite end of the gear-casing. The shaft C is capable of slipping longitudinally through the inner race-member of the bearing 10, and may rotate freely in the anti-friction bearing.

The spring 3 tends to draw the driving-shaft B and the driven-shaft C into direct-coupled relation. A spring 11 attached to the foot-lever E supplements the action of the spring 3, and also serves to shift the driving-shaft and driven-shaft rearwardly as a unit when the pressure of the foot is relieved sufficiently to permit the foot-lever to return to the position shown in Fig. 2. The rearward shifting of the driving-shaft B is limited by the ring $E^1$ striking the bearing 1, and also by the eccentrics being set against shoulders in the concentric position, as further explained hereinafter.

The foot-lever E is mounted on a pivot 12 carried by the gear-casing, or other stationary part. The foot-lever is provided with pin-and-slot engagement 13 with the ring $E^1$. The ring is equipped with an anti-friction bearing, which is so constructed as to permit free rotation of the shaft B within the ring, and at the same time hold the ring against longitudinal movement on the shaft B, as will be understood from Fig. 1.

The vehicle-controlling hand-lever F is mounted on a pivot 14 carried by the gear-casing, or other stationary support. The hand-lever is equipped with a manually actuated catch 15 adapted to engage any one of three notches 16, 17 and 18 of a stationary segment 19. These notches are, respectively, the forward, neutral, and reverse notches of the device, and are so indicated on the drawings. The ring $F^1$ is capable of slipping freely on the driving shaft C, so that the driven-shaft can slip through it when the auxiliary clutch-member 9 is automatically disengaged from the forward gear $D^2$ as the foot-lever returns to the position shown in Fig. 2. The shaft C is, however, equipped with a shoulder, preferably a split ring, $19^a$, disposed back of the shifting ring $F^1$, so that the shaft C can be forcibly retracted or moved rearwardly through the medium of the lever F in the operation of moving the shaft C to either the neutral position or the reverse position. The ring $F^1$ is constructed in two parts, 20 and 21, which have an anti-friction bearing between them; and the lever F is provided with studs 22 which engage slots 23 in the sides of the ring-section 20. Thus, when the lever F holds the shaft C in retracted position, as, for example, in Fig. 3, the ring-section 21 is against the shoulder 19ª and rotates with the shaft, while the thrust of the lever is taken care of by the ball-bearings between the members 20 and 21.

Figure 2:
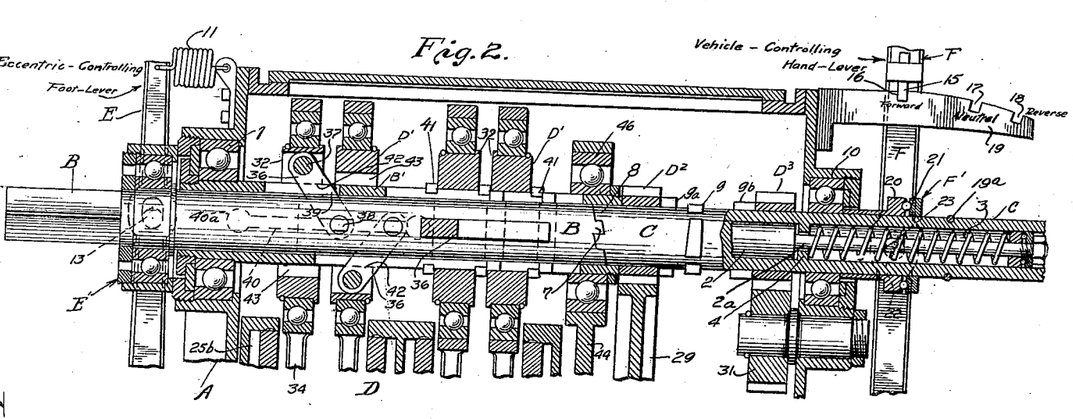
Fig. 2, a broken sectional view of similar character, showing the position of the parts during direct-drive in which position the driving and driven-shafts are direct-coupled and the auxiliary clutch-member of the driven-shaft is disengaged from the forward gear of the transmission mechanism.
Figure 3:
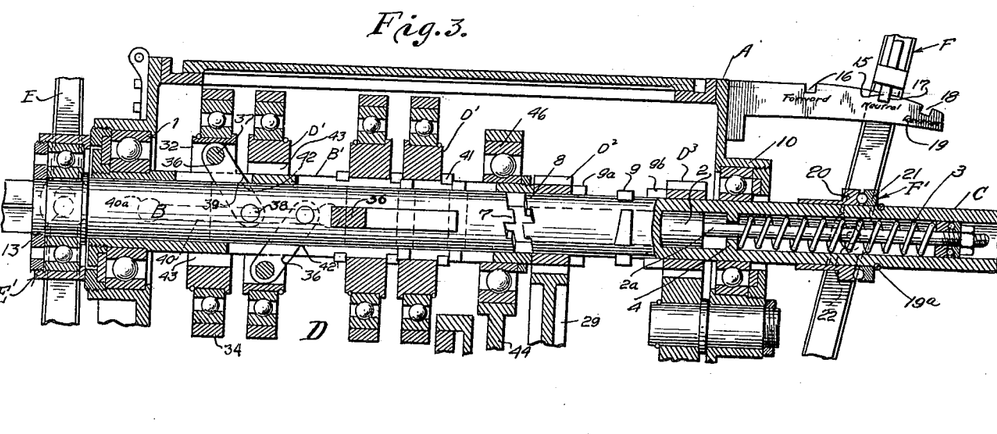
Fig. 3, a view similar to Fig. 2, but showing the hand-lever in the neutral position, in which position neither forward nor reverse drive can be established.
Figures 4, 5, 6:
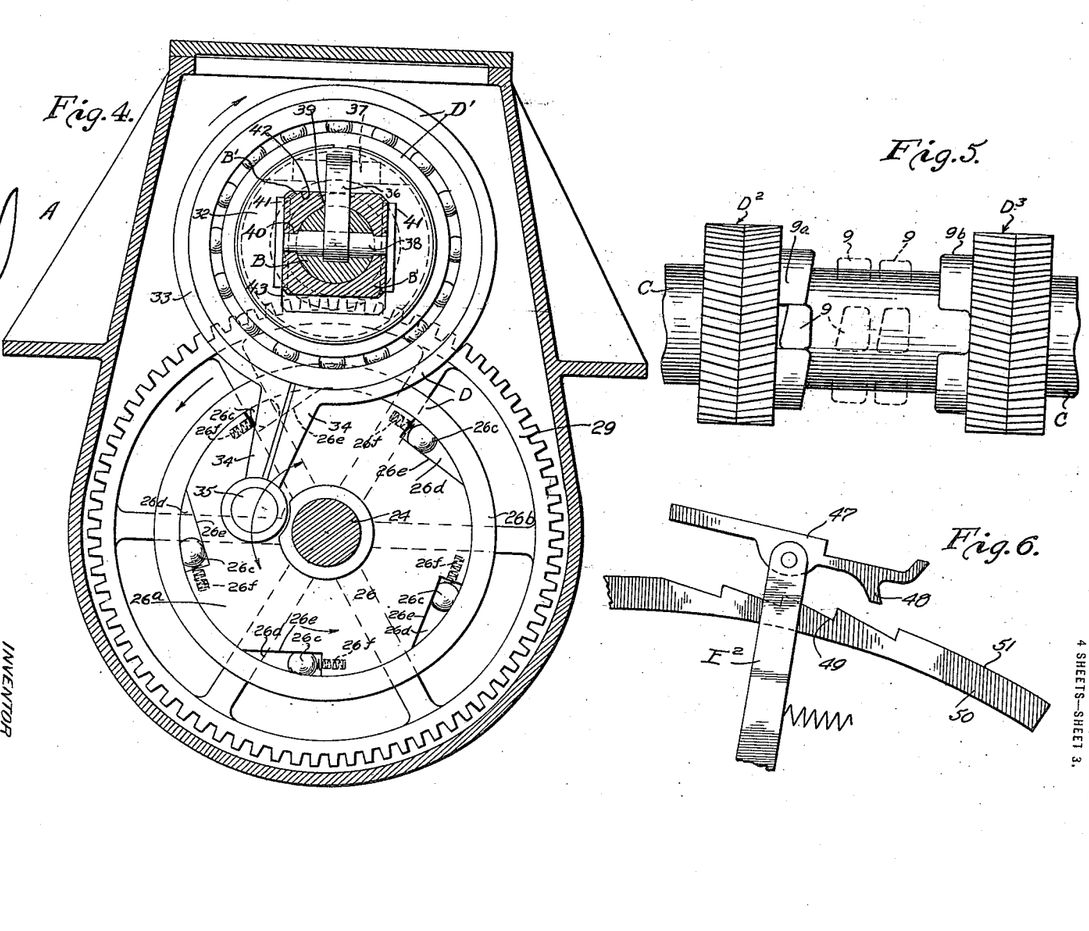
Fig. 4, a transverse vertical section taken as indicated at line 4—4 of Fig. 1.
Fig. 5, an enlarged view of the driven-shaft and the forward and reverse gears journaled thereon.
Fig. 6, a broken elevational view showing a modified form of the foot-lever, in which it is adapted to be set in selected position to drive the vehicle for any length of time through the medium of the variable-throw transmission mechanism.

In Fig. 5, the left-hand dotted position of the clutch-member 9 corresponds with Fig. 2, this being the direct-drive position; and the right-hand dotted position of the clutch-member 9 corresponds with Fig. 3, or the neutral position, in which position the main clutch 7 cannot come into engagement with the clutch 8, and the clutch 9 engages neither the forward gear $D^2$ nor the reverse gear $D^3$.

The variable-throw transmission mechanism D, in the illustration given, comprises the eccentric devices $D^1$; a counter-shaft 24 journaled in the lower portion of the casing, and equipped with a series of friction ratchet devices 25, 26, 27 and 28 corresponding with and actuated by the eccentrics $D^1$, which are shown as four in number; and a forward transmission gear 29 secured to the shaft 24 and serving to actuate the gear $D^2$, and a reverse pinion 30 secured to the shaft 24 and serving to actuate the gear $D^3$ through the medium of an idler 31. The tubular shaft $B^1$ is preferably of square form externally to provide bearings for the transverse shifting of the eccentrics and to cause the rotation of the eccentrics by said shaft. Each eccentric device comprises an eccentric member 32 mounted for transverse adjustment on the shaft $B^1$, and an eccentric ring 33 anti-frictionally journaled on the eccentric and provided with an arm 34. The ratchet device 26, for illustration, preferably comprises an oscillating disk 26ª journaled on the counter-shaft 24 and connected with the arm 34 of the corresponding eccentric by means of a wrist-pin 35; a coacting flanged disk 26ᵇ keyed to the counter-shaft 24; and rolling gripping devices 26ᶜ confined in recesses 26ᵈ between the flange of the disk 26ᵇ and the periphery of the disk 26ª. These recesses have inclined walls 26ᵉ upon which the balls, or rollers, travel; and springs 26ᶠ are preferably employed to force the balls into gripping engagement.

The ratchet devices 25, 27 and 28 are similarly constructed. The flanged disks 26ᵇ and 27ᵇ are, for convenience, constructed in one member, or in the form of a double flanged wheel.

It will be understood that as the eccentrics are actuated, they oscillate the disks of the friction ratchets, and this oscillating movement is converted into rotary movement of the counter-shaft 24, thus causing the gear $D^2$ on the driven shaft to rotate in one direction, and the gear $D^3$ to rotate in the opposite direction. The shaft C may be coupled to either one of said gears, at will, by shifting the lever F. The shaft C has telescopic connection with a shaft $C^1$ which is splined thereon; and the shaft $C^1$ may be connected through a universal shaft with the differential gear of the vehicle, where the mechanism is used for automobile purposes.

The means whereby the shifting of the eccentrics is accomplished by the shifting of the driving-shaft B preferably comprises a link 36 for each eccentric, connected with the eccentric by means of a pin 37, and connected with the shaft B by means of a pin 38. These links extend through slots 39 in the tubular shaft $B^1$; and the pins 38 have their ends adapted to work in slots 40 in the tubular shaft $B^1$. Preferably, the end-portions of the pins 38 are cut away or flattened to afford suitable guide-connections with the slots 40; and, for convenience in assembling, the slots 40 are provided at their extremities with enlargements 40ª to enable the pins to be inserted in entering them in the slots 40. Any suitable bearings may be provided for the extremities of the pins 38. It is preferred to transmit the force necessary to rotate the shaft $B^1$ through the pins 38, rather than through the links 36. If desired, however, both of these parts may serve for this purpose.

It is preferred to arrange the eccentrics in two pairs, with the members of each pair balanced against each other, or adapted to shift in opposite directions; also, it is preferred to have the pairs set 90° apart in angular relation. By this arrangement, the eccentrics counter-balance each other on the driving-shaft and serve to impart successive impulses to the counter-shaft 24. The eccentrics are confined against movement longitudinally on the shaft $B^1$ by means of transverse guides 41. The eccentrics are shown in the concentric position, in which position the shoulders 42 are bearing against the outer surfaces of the shaft $B^1$, and the slots 43 of the eccentrics which embrace the shaft B′ will permit the necessary movement to the eccentric position.

The extreme throw of the eccentrics and the position of the wrist-pins 35 with relation to the counter-shaft 24 determine the maximum oscillation of the disks of the ratchet devices. It is preferred to so proportion the gears 29 and $D^2$, taking into consideration the amplitude of the oscillation of the disks of the ratchet devices, as to impart to the driven-shaft C, when the eccentrics are in the position of extreme eccentricity, a speed of rotation only slightly less than that of the driving shaft B. In the illustration given, the counter-shaft 24 will rotate, under such conditions, at a little less than one-fourth the speed of the driving-shaft, and a four-to-one gear ratio between the gear 29 and the gear $D^2$ thus serves to rotate the shaft C at approximately the speed of the driving shaft. Thus, when the driving shaft is allowed to be brought into direct-coupled relation with the driven-shaft, the transition is effected without shock.

In the construction illustrated, the driven-shaft and the counter-shaft 24 are shown connected by a stiffening member 44, which is provided with a journal 45 for the shaft 24, and a journal 46 for the driven-shaft.

In Fig. 6, E² represents a modified form of foot-lever for adjusting the eccentrics through the medium of the driving-shaft. In this form, the lever is equipped with the pivotally-mounted foot-pedal 47, by means of which the foot-lever may be actuated against the force of its spring; and the foot-pedal is provided with a catch 48 which may be caused to engage a tooth 49 of a stationary segment 50 over which the foot-pedal moves. The toothed portion of the segment 50 corresponds with the range of movement of the shaft B from the position shown in Fig. 1 to the point where the eccentrics are in their extreme eccentric position, so that the foot-lever may be set to enable the vehicle to be propelled at any desired speed within the range of operation of the eccentric mechanism. The rear portion 51 of the segment is without teeth, as this corresponds with that portion of the range of movement of the driving-shaft B in which the eccentrics are returned to their concentric position, the direct-coupling of the driving and driven shafts effected, and the driven-shaft forced rearwardly by the driving-shaft to disengage the clutch 9 from the clutch-member 9ª of the gear D². In this range of movement, there is no necessity for the teeth, and it is desirable to omit them to prevent the possibility of accidental engagement, which might interfere with the quick shift to the direct-coupled position which is desirable.

The manner of use of the device for ordinary automobile purposes will be readily understood. The shaft B is actuated directly by the motor, and may have telescopic, splined engagement with the motor-shaft. Assuming the machine to be standing in a street, the vehicle-controlling hand-lever F will be in the neutral position shown in Fig. 3, and the foot-lever E will be in the position shown in said figure. Assuming that it is desired to drive the vehicle forwardly, the operator pushes the foot-lever forward to the position shown in Fig. 1, in which operation the eccentrics are quickly shifted to the eccentric position, and then back to the concentric position; the hand-lever F is then set in the forward position, that is with the catch 15 of the hand-lever in engagement with the notch 16, and the spring 3 forces the driven-shaft to follow the movement of the hand-lever, so that the driven-shaft occupies the position shown in Fig. 1, with the clutch-member 9 in engagement with the clutch-member 9ª of the forward gear D² of the variable-speed power-transmission mechanism; the operator then allows the foot-lever to be returned gradually by the action of the springs, just as a clutch is allowed to come into engagement, and the gradual shifting of the eccentrics causes a gradual increase in the speed of transmission from the driving-shaft to the counter-shaft 24, and back to the gear D², so that the driven-shaft C has its speed gradually increased, thus getting the vehicle under way by a very gradual increase in speed. After the eccentrics reach the extreme eccentric position, and the machine is well under way, with the shaft C rotating at approximately the speed of the shaft B, the operator withdraws his foot, thus allowing the driving-shaft to be shifted into the direct-coupled position, and then to carry the driven-shaft rearwardly a sufficient distance to disengage the clutch-member 9 thereof from the clutch-member of the gear D². Thus, without movement of the lever F (other than setting it for the forward movement) the vehicle is brought from a position of rest to a forward speed corresponding with the speed of the driving shaft; and this transition may be accomplished without any shock upon the mechanism by governing the movement of the foot-lever to correspond with the resistance encountered in starting the vehicle. By a very slight shifting of the eccentrics, the vehicle may be caused to "creep." Under such conditions, the engine may be run at full speed if necessary, and the torque transmitted to the driving wheels will be the maximum of which the engine is capable. In passing to the direct-coupled condition, a theoretically infinite number of speed ratios is passed through, this being characteristic of a variable-throw transmission mechanism of this character.

The engine may be wholly disconnected from the driven-shaft C by adjusting the hand-lever F in the position shown in Fig. 3; and inasmuch as the variable-speed transmission mechanism rotates the reverse gear D³ continuously when the eccentrics are out of the concentric position a backward movement of the vehicle is obtained by moving the lever F to the reverse position, which brings the clutch-member 9 into engagement with the clutch-member 9ᵇ of the gear D³.

It sometimes becomes necessary for a vehicle to be propelled for a long distance at slow speed, as where the vehicle is passing over a soft road. Usually, it will be desirable to provide some means for setting the driving-shaft B in an adjusted position. This may be simply accomplished by means of a foot-lever of the type shown in Fig. 6.

From the description given, it will be understood that the mechanism described embodies the use of a gradually-variable speed transmission mechanism, preferably employing eccentrics to produce a variable throw of the disks of the ratchet devices. Also, it will be understood that this construction is well adapted to motor-driven vehicles, owing to the fact that the shifting of the eccentrics and the consequent variation of speed is accomplished by means of a foot-lever, manipulated like the ordinary clutch-lever of a motor-vehicle, while the movement of the vehicle is controlled by the hand-lever F corresponding somewhat in its movements to the gear-shifting lever of the common sliding gear transmission mechanism of an automobile. The shifting of gears is, however, wholly obviated; and the shifting of the clutch-member 9 is in reality accomplished by the foot permitting the spring 11 to retract the lever E and force the driven-shaft C rearwardly through the medium of the driving-shaft. Thus, the hand-lever F may be preparatorily set for either forward or backward movement; and it is unnecessary to go through a series of shifting movements of the hand lever corresponding with the shifting movements for a sliding gear transmission in attaining a direct-speed ahead.

Figures 7, 8, 9:
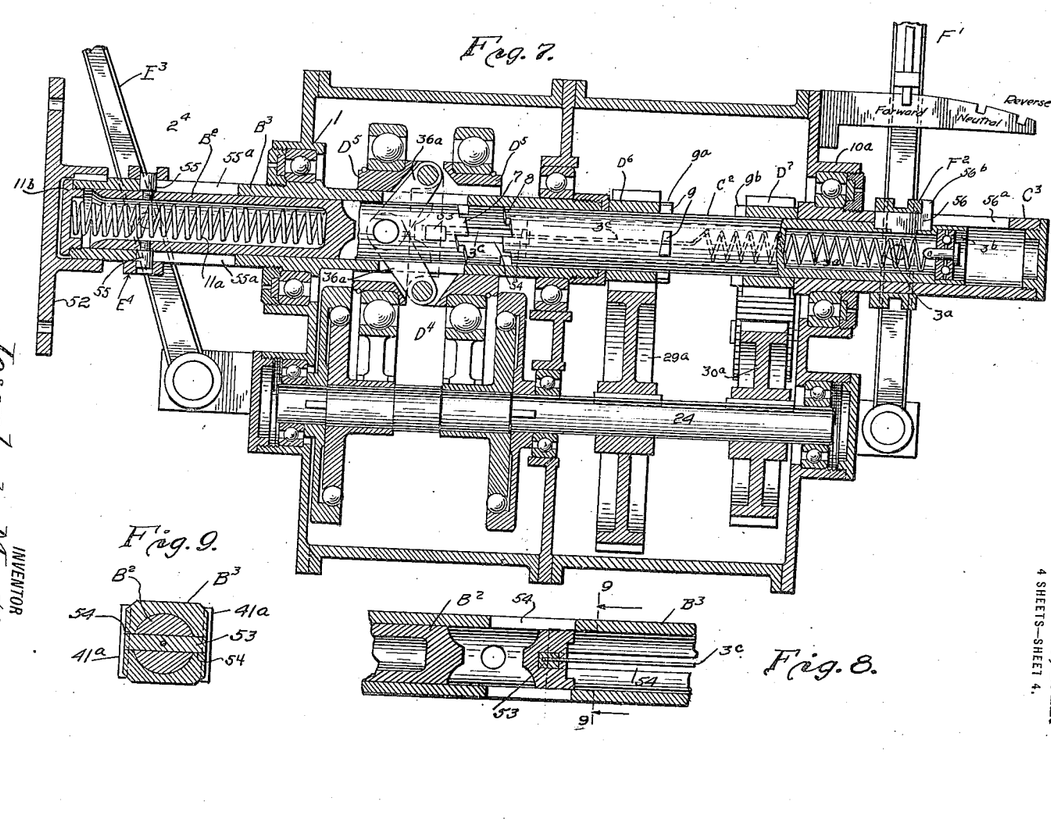
Fig. 7, a longitudinal sectional view showing a modification of the transmission mechanism, in which the driving and driven shafts are of modified construction.
Fig. 8, a broken longitudinal sectional view of the driving shaft in the modified form.
Fig. 9, a transverse section taken as indicated at line 9 of Fig. 8.

In the modified construction shown in Figs. 7 to 9, inclusive, the tubular driving shaft on which the eccentrics are mounted is extended forwardly and equipped with a disk 52 adapted to be secured to the crank-shaft of the motor, or to the fly-wheel on the crank shaft, and the eccentric shifting shaft is adapted to be adjusted through the medium of a foot-lever equipped with a shifting ring, which is provided with studs which extend through suitable slots in the tubular driving shaft. In this construction, the spring which serves to shift the driving shaft and the driven shaft as a unit in effecting automatic disengagement of the auxiliary clutch-member of the driven shaft from the forwardly-rotating gear of the variable speed transmission mechanism is confined in a bore in the front end of the shiftable, or inner section, of the driving shaft. Also, the construction of the driven shaft is modified, as will be explained. In this construction, $B^2$ represents the inner, longitudinally shiftable section of the driving shaft, which serves to effect transverse adjustment of the eccentrics; $B^3$ represents the tubular driving shaft upon which the eccentrics are mounted; $C^2$ represents the longitudinally shiftable section of the driven shaft, which is equipped with a main clutch-member for direct connection with the driving shaft and with an auxiliary clutch-member for connection with either the forwardly-rotating gear or the rearwardly-rotating gear of the variable-speed transmission mechanism, which gears are journaled on the shaft $C^2$; $C^3$ represents the longitudinally immovable section of the driven shaft; $D^4$ represents gradually-variable-speed transmission mechanism, which has eccentrics $D^5$ mounted on the tubular driving shaft $B^3$, and which also has a forwardly-rotating gear $D^6$ and a rearwardly-rotating gear $D^7$ journaled on the shaft $C^2$; $E^3$ represents the foot-lever which controls the position of the eccentrics; and $F^1$ represents the vehicle-controlling hand-lever by means of which the rotation of the shaft $C^3$, and consequently the movement of the vehicle, is controlled.

In the construction now being described, power is transmitted directly from the motor through the medium of the tubular driving shaft $B^3$ to the eccentrics $D^5$; and motion is communicated from the tubular shaft $B^3$ to the inner shiftable shaft $B^2$ by means of a key 53, which is fixedly secured in a transverse opening in the solid rear end of the shaft $B^2$, and which has its extremities working in slots 54, with which the tubular shaft $B^3$ is provided. The inner eccentric shifting shaft $B^2$ is not provided with a reduced rearward extension, as in the first described construction. The shaft $C^2$ is, however, made tubular; and a tension spring $3^a$ is employed to draw the shafts $B^2$ and $C^2$ together into direct-connected relation. The rear end of the spring $3^a$ is connected with an internal disk $3^b$, and the front end of the spring is provided with an extension $3^c$, which extends forwardly and has threaded connection with the rear end of the shaft $B^2$. As shown, the extension, or rod, $3^c$, has threaded connection with the key 53 which extends transversely through the rear end of the shaft $B^2$.

The main or direct-clutch members 7 and 8 at the meeting ends of the driving and driven shafts, the auxiliary clutch 9 of the driven shaft, and the auxiliary clutch-members $9^a$ and $9^b$ of the forwardly-rotating and rearwardly-rotating gears $D^6$ and $D^7$ are employed, as in the first described construction.

Figure 1:
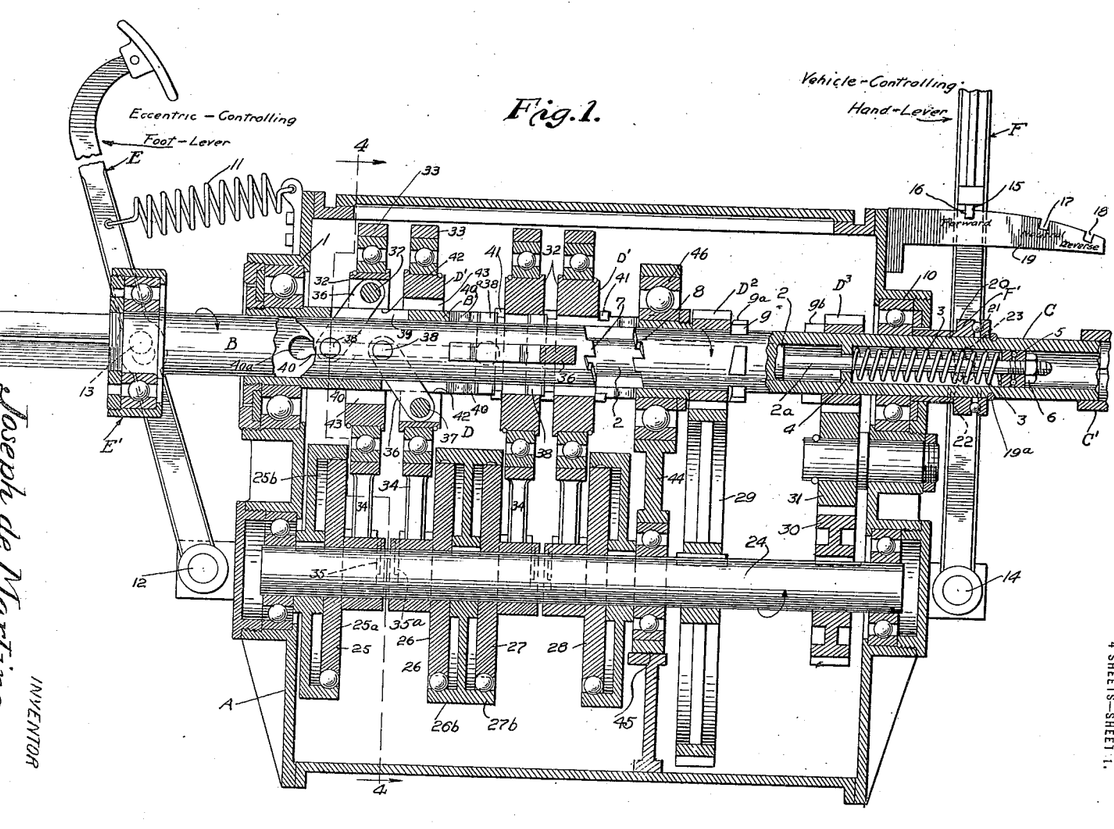
Fig. 1 is a longitudinal vertical sectional view of power-transmission mechanism embodying the invention, the vehicle-controlling lever being set in a position for forward-drive, and the foot-lever being in position to hold the driving-shaft in non-driving position.

Instead of the spring 11 shown in Fig. 1, there is employed a spring $11^a$ confined in a bore in the front end of the shaft $B^2$, and having its front end bearing against the cap, or plug, $11^b$, secured to the front end of the shaft $B^3$. The spring $11^a$ is adapted to shift the slidable sections of the driving and driven shafts as a unit after direct coupling is established, and cause the auxiliary clutch-member 9 to be disengaged from the auxiliary clutch-member $9^a$ of the gear $D^6$.

The position of the sliding section $B^2$ of the driving shaft is controlled by the foot-lever $E^3$, which is equipped with a shifting ring $E^4$ having studs 55, which engage the shaft $B^2$ and work in slots $55^a$, with which the shaft $B^3$ is provided.

The longitudinally immovable section $C^3$ of the driven shaft extends through and is journaled in the anti-friction bearing 10ª. The longitudinally movable section C² of the driven shaft is adapted to be shifted through the medium of a shifting-ring F² controlled by the handle-lever F¹. The shaft C² is equipped with a key 56 adapted to slide in a slot 56ª, with which the shaft C³ is provided. The key 56 is provided with a lug, or shoulder, 56ᵇ, which engages the rear surface of the ring F². The shaft C² can thus slip rearwardly through the ring F² when the driven shaft-section C² is moved rearwardly through the medium of the driving shaft-section B², actuated by the spring 11ª, thus automatically disengaging the auxiliary clutch-member 9 from the gear D⁶ after the direct coupling of the driving and driven shafts has been established. The main clutch-members 7 and 8 preferably are of the jaw-clutch type, adapted to come easily into engagement, but so constructed that either a driving or retarding torque can be transmitted directly from the driving shaft to the driven shaft, thus enabling the motor to drive the vehicle in the ordinary operation, and also enabling the motor to be used as a retarding influence, or as a brake upon the movement of the vehicle, when desired.

The counter-shaft 24 of the transmission mechanism is adapted to be actuated by the eccentrics D⁵, as in the first described construction. Motion is communicated in a forward direction to the gear D⁶ by the gear 29ª; and motion is communicated in a reverse direction to the gear D⁷ by a gear 30ª and an interposed idler.

The eccentrics are shifted by means of links 36ª between the driving shaft-section B² and the shiftable eccentric members. In Fig. 9, the shaft B³ is shown equipped with guides 41ª for the eccentrics.

The construction illustrated in Figs. 7 to 9, inclusive, may be more cheaply manufactured than the first described construction, and provides a more desirable arrangement of the driving and driven shafts. In each construction, the variable-throw actuating member of the gradually variable speed transmission mechanism, which is mounted on the driving shaft, is an eccentric; and in each construction the eccentric is mounted on a longitudinally immovable tubular section of the driving shaft, and is shifted through the medium of a longitudinally movable inner section of the driving shaft. This is a desirable feature of construction. In each construction, the shifting of the eccentrics, the establishment of direct-connection, and the automatic disengagement of the driven shaft from the forwardly-rotating gear of the transmission mechanism is controlled by a foot-lever, while the movements of the vehicle are controlled by a hand-lever. This is a very desirable and preferred arrangement.

If desired, the mechanism may be suitably modified to permit power to be transmitted directly from the counter-shaft 24 to the drive-wheels of the machine, omitting the feature of establishing direct drive through the shaft C. Thus, for tractors, tanks, etc., the feature of direct-coupling to cause the driven shaft to rotate at the same speed as the driving shaft may be omitted.

What I regard as new, and desire to secure by Letters Patent, is:

1. The combination of a driving shaft and a driven shaft, means for yieldingly holding them in direct-coupled relation, variable throw transmission mechanism between said shafts provided with a forward-rotation gear, spring means for shifting said shafts as a unit, and means clutching the driven shaft to said forward-rotation gear, disengageable in the movement of shifting said shafts as a unit.

2. The combination of a shiftable driving-shaft and a shiftable driven shaft, means for yieldingly holding them in direct-coupled relation, continuously variable transmission mechanism between said shafts, a lever controlling the position of said driving shaft in both directions of shifting, a lever adapted to shift said driven shaft in one direction and to permit slippage of the driven shaft therethrough, and auxiliary clutch connections between the transmission mechanism and driven shaft, releasable by the shifting of said driven shaft when the latter is shifted through the medium of said driving shaft.

3. The combination of a shiftable driving shaft and a shiftable driven shaft in direct-clutched relation, the driven shaft being shiftable by the driving shaft, means controlling the positions of said shafts, said means permitting shifting of the driven shaft by the driving shaft, variable throw transmission mechanism between said shafts, and means dependent on the positions of said driven shaft for connecting said transmission mechanism to said driven shaft.

4. The combination of a longitudinally immovable tubular shaft, an eccentric mounted for transverse movement with relation thereto, a longitudinally shiftable shaft extending into said tubular shaft, a link pivotally connected with said second-named shaft and with said eccentric and serving to shift the eccentric, guide-connections between the pivot of the inner end of said link and said tubular shaft, and mechanism for transmitting power from said eccentric.

5. The combination of a driven shaft, variable-throw transmission mechanism having a gear loose on said shaft, means for actuating said transmission mechanism, including a longitudinally shiftable shaft adapted for direct connection with said driven shaft, means for coupling said gear to said driven shaft, adapted to be disengaged in the operation of shifting said second-named shaft, and a lever for shifting said second-named shaft.

6. The combination of a driven shaft, variable-throw transmission mechanism having a gear loose on said shaft, means for actuating said transmission mechanism, including a longitudinally shiftable shaft adapted for direct connection with said driven shaft, means for coupling said gear to said driven shaft, adapted to be disengaged in the operation of shifting said second-named shaft, and means actuated by said second-named shaft for varying the throw of said transmission mechanism.

7. The combination of a longitudinally movable driving shaft, a spring-retracted foot-lever controlling the position thereof, means whereby said foot-lever may be set in predetermined position, variable-throw transmission mechanism, including an eccentric member mounted on and rotated through the medium of said driving shaft and eccentrically adjusted in the longitudinal movement of said driving shaft, and a driven shaft actuated by said transmission mechanism.

8. The combination of a longitudinally movable driving shaft, a spring-retracted foot-lever controlling the position thereof, means whereby said foot-lever may be set in predetermined position, variable-throw transmission mechanism, including an eccentric member mounted on and rotated through the medium of said driving shaft and eccentrically adjusted in the longitudinal movement of said driving shaft, a driven shaft, and means whereby said driven shaft may be actuated in either direction by said transmission mechanism.

9. The combination of alined driving and driven shafts, transmission mechanism between them having a variable-throw actuating member mounted on and actuated by said driving shaft, lever-controlled means for shifting said actuating member to vary its throw, and lever-controlled main and auxiliary clutch-devices, respectively, for coupling said driven shaft to said driving shaft for direct-drive and to said transmission mechanism for indirect-drive, the auxiliary clutch-device being automatically disengaged from said transmission mechanism in establishing direct-driving conditions.

10. The combination of a tubular shaft, a variable-throw actuating member mounted thereon, a spring-retracted, longitudinally shiftable shaft serving to adjust said actuating member and which is provided with a main-clutch member, a spring serving normally to retract said second-named shaft, a lever controlling the position of said second-named shaft, a driven shaft provided with a main clutch-device and an auxiliary clutch-device which are movable as a unit, means for shifting said clutch devices, transmission mechanism actuated by said variable-throw actuating member and having a gear coaxial with said driven shaft and equipped with an auxiliary clutch-member, and a spring tending to effect direct-coupling of said driving shaft and said driven shaft.

11. The combination of a tubular shaft, a variable-throw actuating member mounted thereon, a spring-retracted, longitudinally shiftable shaft serving to adjust said actuating member and which is provided with a main-clutch member, a lever controlling the position of said second named shaft, a driven shaft provided with a main clutch-device and an auxiliary clutch-device which are movable as a unit, means for shifting said clutch-devices, transmission mechanism actuated by said variable-throw actuating member and having a gear coaxial with said driven shaft and equipped with an auxiliary clutch-member, a spring tending to effect direct-coupling of said driving shaft and said driven shaft, and a spring adapted to automatically disconnect the auxiliary clutch-device when direct-driving conditions are established.

12. The combination of a tubular shaft, a variable-throw actuating member thereon, a longitudinally shiftable shaft extending within said first-named shaft and provided with a main clutch member and with means for shifting said actuating member, said shafts rotating as a unit, a driven shaft having a longitudinally shiftable portion provided with a main clutch-member and an auxiliary clutch-member, a spring tending to throw said second-named shaft into direct-coupled relation with said driven shaft, transmission mechanism actuated by said variable-throw actuating member and provided with a gear co-axial with said driven shaft equipped with an auxiliary clutch-member, a spring serving to shift said second named shaft and effect automatic disengagement of the auxiliary clutch, and vehicle-controlling means adapted to control the clutch-members of said driven shaft and to permit automatic disengagement of the auxiliary clutch.

13. The combination of a longitudinally immovable tubular driven shaft, a driven shaft-section extending thereinto and serving to actuate the same, said section being equipped with a main clutch-member and an auxiliary clutch-member, a lever equipped with means working through a slot in said tubular driven shaft serving to adjust said shaft-section, transmission mechanism having a forwardly-rotating gear and a rearwardly-rotating gear journaled on said shaft-section and equipped with auxiliary clutch-members, a driving shaft equipped with a variable-throw actuating member serving to actuate said transmission mechanism, and means associated with said driving shaft for varying the eccentricity of said variable-throw actuating member and controlling the engagement of the main clutch-members.

14. Mechanism of the character set forth comprising direct-coupled driving and driven shafts, variable-throw transmission mechanism between them having a forwardly rotating gear adapted to be coupled to the driven shaft, and means normally maintaining direct-coupled relation between the driving and driven shafts and uncoupled relation between said gear and the driven shaft, when the mechanism is set for forward drive.

JOSEPH DE MARTINO.